United States Patent [19]

Long

[11] 4,132,324

[45] Jan. 2, 1979

[54] STABILIZER ASSEMBLY

[75] Inventor: Elton B. Long, Burlington, Iowa

[73] Assignee: J. I. Case Company, Racine, Wis.

[21] Appl. No.: 865,733

[22] Filed: Dec. 29, 1977

[51] Int. Cl.[2] .......... B60S 9/10

[52] U.S. Cl. .......... 214/138 R; 212/145; 280/764

[58] Field of Search .......... 214/138 R, 140; 212/145; 280/763, 764, 765

[56] References Cited

U.S. PATENT DOCUMENTS

| | | | |
|---|---|---|---|
| 3,167,188 | 1/1965 | Burgess | 212/145 |
| 3,261,476 | 7/1966 | Gernhardt et al. | 212/145 X |
| 3,918,741 | 11/1975 | Olson et al. | 212/145 X |
| 3,951,281 | 4/1976 | Parquet | 214/140 |
| 3,955,695 | 5/1976 | Maurer | 214/140 |

*Primary Examiner*—L. J. Paperner
*Attorney, Agent, or Firm*—Dressler, Goldsmith, Clement, Gordon & Shore, Ltd.

[57] ABSTRACT

A stabilizer assembly for a construction vehicle having at least one stabilizer arm which can be pivoted laterally inwardly of the fixed pivot point of an associated fluid cylinder power unit. Preferably the stabilizer arm has a pair of spaced stabilizer arm members which define a passageway therebetween for passage of a single fluid ram during pivoting of the stabilizer arm.

13 Claims, 4 Drawing Figures

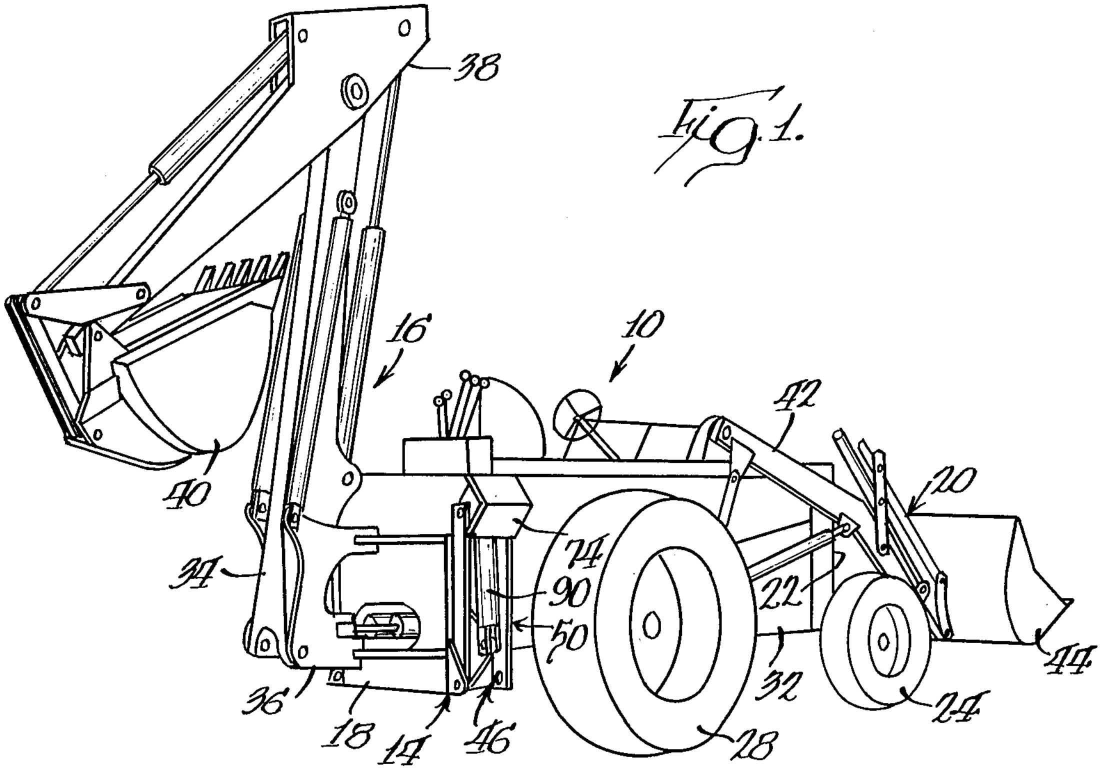
Fig. 1.
Fig. 2.
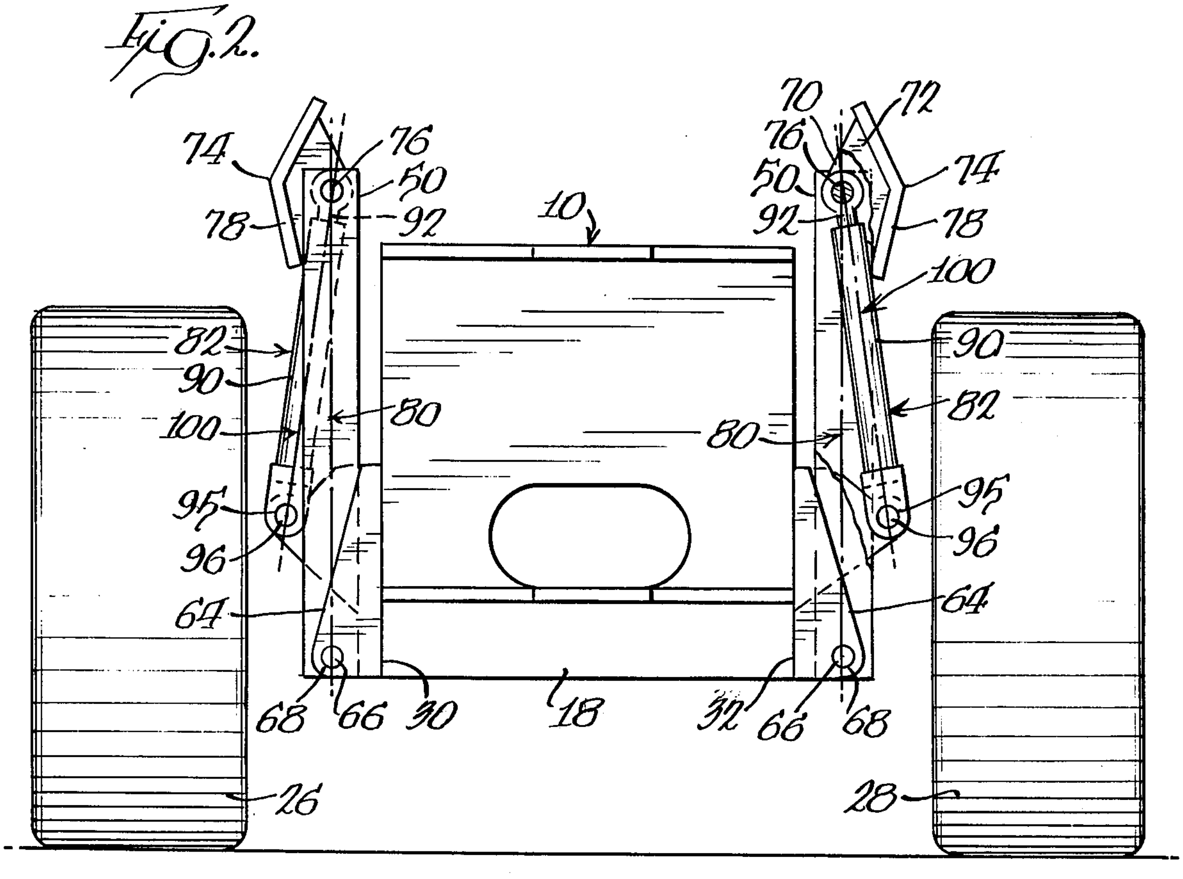

STABILIZER ASSEMBLY

BACKGROUND OF THE INVENTION

This invention relates to a wheeled construction vehicle, such as backhoes, having at least one material handling implement, and more particularly, to a novel stabilizer assembly for providing lateral stabilization and support of the vehicle during operation of the material handling implement.

Many types of wheeled construction vehicles such as backhoes, power shovels and boom cranes have one or more stabilizer arms, sometimes referred to as outriggers, to provide lateral stabilization and support of the construction vehicle during operation of the material handling implement carried by the vehicle. In backhoes, the stabilizer arms are typically positioned at the rear end of the vehicle, although auxiliary stabilizer arms positioned at the front end of the vehicle to support the loader unit have been found in some instances to be advantageous. Typical of some types of stabilizer arm arrangements are shown in U.S. Pat. Nos. 3,376,984; 3,951,281, 3,955,695 and 4,026,428.

The stabilizer arm can be powered by various power sources. One type of conventional power source that is often utilized in the construction vehicle industry, is a fluid ram or cylinder power unit, such as a hydraulic cylinder and piston rod assembly. The fluid cylinder power unit serves to move the stabilizer arm from a ground engaging and stabilizing position during operation of the materially handling implement to an upright storage or transport position during movement of the vehicle. If the fluid cylinder accidentally leaks or the fluid pressure otherwise drops significantly, the stabilizer arm in some conventional arrangements has a tendency to drop outwardly of the wheels which can present a hazard for pedestrians and other vehicles.

It is therefore desirable to provide an improved stabilizer assembly which substantially overcomes the preceding disadvantages.

SUMMARY OF THE INVENTION

An improved stabilizer assembly for a wheeled construction vehicle is provided for substantially preventing at least one stabilizer arm from accidently dropping outwardly of the wheels if its associated fluid ram should leak or otherwise lose significant fluid pressure during movement of the vehicle.

The stabilizer arm of this invention has one end pivotally connected to the vehicle frame about a fixed stabilizer pivot point and another end positioned remote from the fixed stabilizer pivot point. The other end, sometimes referred to as the "free end" or "swingable end", is movable from a ground engaging and support position during operation of the material handling implement to a generally upright over-center transport position during movement of the vehicle. A plane extending through the fixed stabilizer pivot point and the other end of the stabilizer arm generally defines a stabilizer arm axis.

The fluid cylinder power unit of the stabilizer assembly has one end pivotally connected to the vehicle frame about a fixed fluid cylinder pivot point and another end positioned remote from the fixed fluid cylinder point. The other end of the fluid cylinder power unit is connected to the free end of the stabilizer arm. A plane extending through the fixed fluid cylinder pivot point and the other end of the fluid cylinder power unit generally defines a pivotable fluid cylinder axis.

The stabilizer assembly is constructed and arranged so that the fixed fluid cylinder pivot point is positioned laterally outward of the fixed stabilizer pivot point and with the pivotable fluid cylinder axis located laterally outward of the pivotable stabilizer axis when the stabilizer arm is in the over-center transport position. Such relationship permits the stabilizer arm to be positioned laterally inwardly of the fixed fluid cylinder point during movement of the vehicle, which generally prevents the stabilizer arm from accidentlly extending outwardly of the wheels in the over-center transport position if the fluid cylinder power unit should lose substantial fluid pressure.

In the preferred embodiment, the stabilizer arm may include a pair of stabilizer arm members which are spaced apart from each other with the fluid cylinder power unit positioned intermediate the pair of stabilizer arm members as viewed in top plan view. The stabilizer assembly may also include a stabilizer foot which is connected to the free ends of the stabilizer arm and the fluid cylinder power unit by a common pivot pin.

In the preferred form, the fixed fluid cylinder pivot point is positioned above the fixed stabilizer pivot point and the stabilizer arm is positioned inwardly of the outer edges of the wheels in the over-center transport position. In the over-center transport position, the pivotable fluid cylinder axis is inclined upwardly and inwardly with respect to a vertical plane and the stabilizer arm axis extends substantially parallel to the vertical plane.

In construction vehicles which utilize a pair of stabilizer arms and a pair of fluid cylinder power units, the minimum distance between the fixed fluid cylinder points of the fluid cylinder power units should be greater than the minimum distance between the fixed stabilizer pivot point of the pair of stabilizer arms with the stabilizer arms positioned generally upright and between the fixed fluid cylinder pivot points when the stabilizer arms are in the over-center transport position.

A more detailed explanation of the invention is provided in the following description and appended claims taken in conjunction with the accompanying drawings.

BRIEF DESCRIPTION OF THE DRAWINGS

FIG. 1 is a perspective view of a wheeled construction vehicle having a stabilizer assembly in accordance with principles of the present invention;

FIG. 2 is a rear end view of portions of the wheeled construction vehicle illustrating the stabilizer assembly in a generally upright over-center transport position;

DETAILED DESCRIPTION OF THE ILLUSTRATIVE EMBODIMENT

Figure 3:
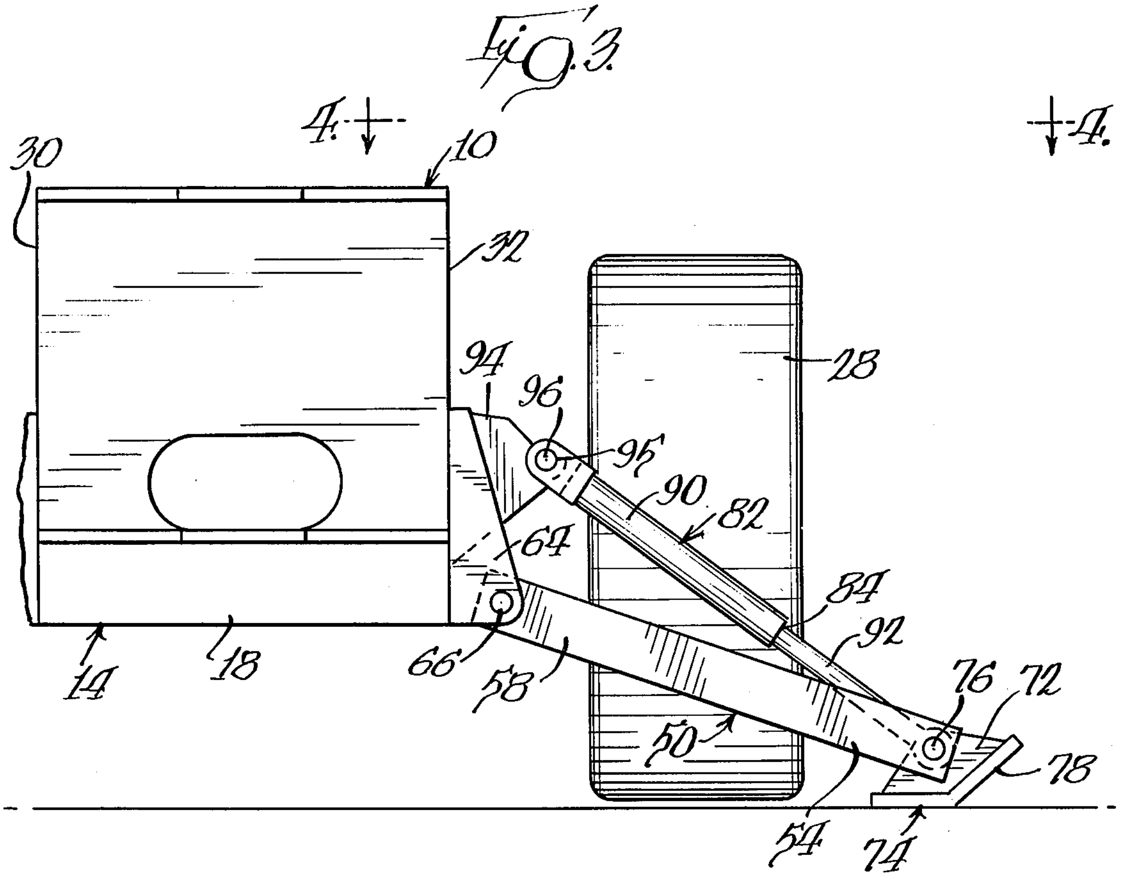
FIG. 3 is a rear end view of portions of the wheeled construction vehicle illustrating the right stabilizer arm in a ground engaging position.

FIG. 1 of the drawings illustrates a wheeled construction vehicle 10 of the type commonly referred to as a "loader/backhoe" or simply "backhoe". Vehicle 10 includes a frame or chassis 14, a backhoe unit or first material handling implement 16 operatively connected to and supported on the rear end 18 of the frame 14 and a loader unit or second material handling implement 20 operatively connected to and supported on the front end 22 of the frame 14.

A pair or set of front steering wheels 24 and rear driving wheels 26 and 28 (FIG. 2) accommodate movement of the backhoe and dynamically support the frame 14 during movement of the vehicle 10. Frame 14 has opposed sides 30 and 32 (FIGS. 1 and 2) with the front end 22 and rear end 18 extending laterally between and connecting the opposed sides 30 and 32.

The backhoe unit 16 includes a powered boom 34, which has its lower end pivotally mounted on a cradle type swing tower 36 and has its upper end pivotally connected to a dipper stick assembly 38. The outer end of the dipper stick assembly 38 has a bucket 40 pivotally connected thereto. Desirably, boom 34 and dipper stick assembly 38 are of substantial length so that bucket 40 can be moved a substantial distance from the rear end 18 of the vehicle 10. One type of backhoe unit 16 that can be used in the construction vehicle 10 is shown and described in Long, U.S. Pat. No. 3,047,171.

The loader unit 20 on the front end 22 of the vehicle 10 generally includes a pair of elongated lift or loader arms 42 that are pivotally supported on opposite sides 30 and 32 of the frame 14 intermediate the opposite ends 18 and 22 thereof. The forward ends of the arms 42 normally extend forwardly of the frame 14 and a power-operated bucket 44 is pivotally connected to the outer ends of the arms 42. One type of loader unit 20 that can be used with the construction vehicle 10 is shown and described in Shumaker, U.S. Pat. No. 4,026,428.

In order to provide lateral stabilization and support of the vehicle 10 during operation of the backhoe unit 16 a stabilizer assembly 46 is positioned generally adjacent and in proximity to, as well as rearwardly of, the rear wheels 26 and 28. In the preferred embodiment, the stabilizer assembly 46 includes a pair of elongated stabilizer arms or outriggers 50 which are each pivotable laterally outwardly of the rear wheels 26 and 28 to a ground engaging and supporting position for use during operation of the backhoe unit 16. In the ground engaging position the stabilizer arms 50 can also be utilized to lift the rear wheels 26 and 28 off the ground such as when working in rough terrain.

While a pair of rear stabilizer arms 50 are preferred, in some instances it may be desirable to have only one stabilizer arm. Furthermore, in some circumstances it may be desirable to have one or more auxiliary stabilizer arms mounted adjacent the front end 22 of the vehicle 10.

Figure 4:
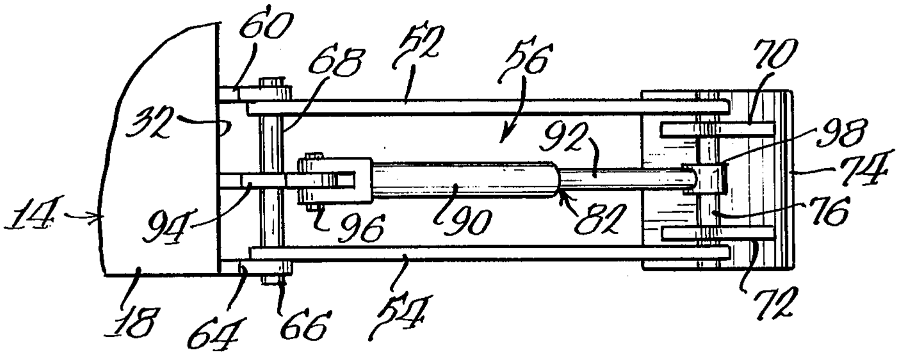
FIG. 4 is a top plan view of the stabilizer assembly taken substantially along line 4—4 of FIG. 3.

In the preferred embodiment each of the stabilizer arms 50 includes a pair of stabilizer arm members 52 and 54 (FIG. 4). Desirably, the stabilizer arm members 52 and 54 are generally of the same size and shape with the forwardmost or first stabilizer arm member 52 generally facing forwardly toward the front end 22 of the vehicle 10 and the rearwardmost or second stabilizer arm member 54 generally facing rearwardly toward the rear end 18 of the vehicle 10.

Stabilizer arm members 52 and 54 are generally straight and are spaced apart from each other to define a passageway or opening 56 therebetween. Passageway 56 permits passage of the fluid cylinder power unit 82 during pivoting of the stabilizer arm members 52 and 54, and permits passage of dirt, mud, rocks and other material from the ground through the passageway 56 when the stabilizer arm members 52 and 54 are moved into and out of the ground engaging position so as to prevent substantial accumulation or "caking up" of dirt, mud, etc. on the stabilizer arm members 52 and 54 which might otherwise adversely affect the balance and performance of the stabilizer arms. Preferably, stabilizer arm members 52 and 54 are positioned in parallel and symmetrical relationship to each other in generally upright planes which are positioned generally parallel to the rear end 18 of the frame 14 with each stabilizer arm member 52 or 54 including an elongated upright generally rigid body 58 (FIG. 3).

As best shown in FIG. 4, the inwardly fixed end of the forwardly facing first stabilizer arm member 52 is pivotally connected to a first stabilizer arm member support bracket 60 about a first fixed stabilizer pivot point and the inwardly fixed end of the rearwardly facing second stabilizer arm member 54 is pivotally connected to a second stabilizer arm support bracket 64 about a second fixed stabilizer pivot point. The pivot points between support brackets 60 and 64 and inwardly fixed ends of the stabilizer arm members 52 and 54 are defined by an inner common pivot pin 66 so that the first and second stabilizer pivot points are on a common axis. Preferably a sleeve 68 is telescoped on pivot pin 66 to maintain a proper spacing between arm members 52 and 54.

The support brackets 60 and 64 are connected to and are part of the sides 30 and 32 of the frame 14. In the illustrative embodiment, each of the support brackets 60 and 64 are ear-shaped and extending laterally outwardly to define bracket means for a stabilizer arm 50.

The outer ends of the stabilizer arm members 52 and 54, sometimes referred to as the "free ends" or "swingable ends" are positioned remote from fixed stabilizer pivot axis 66 and are also pivotally connected to foot brackets 70 and 72 of a stabilizer foot 74 by an outer common pivot pin 76 at a location spaced from the fixed stabilizer pivot axis 66. In operation, the outer ends of the stabilizer arm members 52 and 54 are movable or swingable from a ground-engaging position (FIG. 3) extending laterally beyond the rear wheels 26 or 28 for providing lateral stabilization and support of the vehicle 10 during operation of the backhoe unit or material handling implement 16, to a generally inactive upright over-center transport or storage position (FIGS. 1 and 2) during movement of the vehicle 10. In the illustrative embodiment inner and outer pivot pins 66 and 76 are preferably elongated and straight and the stabilizer foot 74 takes the form of a metal pad having a generally oblique V-shaped outer ground-engaging surface 78 as best shown in FIG. 3.

Geometrically, each of the stabilizer arm members 52 and 54 define a generally straight pivotable stabilizer axis 80 (FIG. 2) that extends between the ends of the stabilizer arm members 52 and 54 and passes through a fixed stabilizer pivot point 62 or 66. In the over-center transport position, both stabilizer arms 48 and 50 and the pivotable stabilizer axes 80 are positioned generally vertically and inwardly of the outer and inner edges of the rear wheels 26 and 28.

In order to move the stabilizer arms 48 and 50 from the ground-engaging position to the over-center transport position and vice versa, each of the stabilizer arms 48 and 50 are powered by a separate fluid cylinder power unit or fluid ram means 82, such as a fluid cylinder and piston rod assembly preferably positioned between the stabilizer arm members 52 and 54, as viewed in top plan view (FIG. 4). In the illustrative embodiment, each fluid cylinder and piston rod assembly 82 includes a hydraulic cylinder 90 and a slidable reciprocable piston rod 92. As seen in FIGS. 2 and 3, the fluid cylinder and piston rod assembly is expandable to the ground-engaging position and retractable to the over-center transport position. In some circumstances it may be desirable to use a pneumatic cylinder.

The inner end (FIGS. 3 and 4) of the hydraulic cylinder 90 is pivotally connected to a fluid cylinder support bracket 94 by a fluid cylinder pivot pin 96 to define a fixed fluid cylinder pivot point. The fluid cylinder support bracket 94 is connected to and part of the frame 14. In the illustrated form, the fluid cylinder support bracket is generally triangular or ear-shaped and extends laterally outwardly of the stabilizer arm pivot pin 66.

The outer end of the piston rod 92 includes an annular mounting bracket 98 (FIG. 4) which circumscribes the outer pivot pin 76 so as to pivotally connect the outer ends of the stabilizer arms 48 and 50. Preferably suitable spacer sleeves (not shown) are telescoped on pin 76 to maintain the proper spacing between arm member 52, 54, foot brackets 70, 72, and bracket 78.

While the described cylinder and piston rod arrangement is preferred, it may be desirable in some circumstances to invert the arrangement, i.e., to connect the outer end of the piston rod to the fluid cylinder support bracket and the fixed end of the cylinder to the outer pivot pin 76.

In order to assure proper positioning of the stabilizer arms 50 (FIG. 2) the fixed fluid cylinder pivot points 96 are located laterally outward of and above the fixed stabilizer pivot points 66 (FIG. 4) (i.e., the fixed stabilizer pivot points 66 are positioned laterally inward of and below the fixed stabilizer pivot points 96). In the preferred embodiment, the fixed stabilizer pivot points 66 are also positioned generally at the same height and are spaced generally equally, both laterally and vertically, from the fixed fluid cylinder pivot points 96. Preferably, the minimum distance between the left and right fixed fluid cylinder pivot points or pins 96 are greater than the minimum distance between the left and right fixed stabilizer pivot points or axes 66 as best shown in FIG. 2.

Geometrically, the fluid cylinder power unit 82 defines a straight pivotable fluid cylinder axis 100 (FIG. 2) that extends between the outer end of the piston rod 92 and the fixed pivoting end of the hydraulic cylinder 90 and passes through the fixed fluid cylinder point 96.

In accordance with principles of the present invention the pivotable fluid cylinder axis 100 is inclined upwardly and inwardly and positioned laterally outwardly of the pivotable stabilizer axis 80 (FIG. 2) with the stabilizer arms 50 located laterally inwardly of the fixed fluid cylinder pivot points 96 when the stabilizer arms 50 are in the generally upright over-center transport position.

The positioning and arrangement of the stabilizer arms 50, fluid cylinder power units 82, pivotable axes 80 and 100 and fixed pivot points 66 and 96 generally prevents the stabilizer arms 50 from accidentally dropping outwardly of the rear wheels in the over-center transport position should either of the fluid cylinder power units 82 accidentally leak or otherwise lose substantial fluid pressure.

The above arrangement also provides a greater moment arm in the ground-engaging position than in some prior art units for increased lift capacity, which can reduce the hydraulic pressure in the system and thereby reduce or eliminate the need for hydraulic lock checks in the system. The arrangement may also result in decreased stresses in the vehicle frame. Smaller fluid cylinders with reduced stroke can also be utilized with the above arrangement than in some prior art units.

While the described construction and arrangement is preferred, it may be desirable in some circumstances to use only a single stabilizer arm member on each side of the vehicle with one or more fluid cylinder power units.

Furthermore, while the stabilizer assembly of the present invention is particularly useful with backhoes, it can also be advantageous with other types of wheeled construction vehicles, such as power shovels and boom cranes.

Although an embodiment of the invention has been shown and described, it is to be understood that various modifications and substitutions may be made by those skilled in the art without departing from the novel spirit and scope of the invention.

What is claimed is:

1. A stabilizer assembly for a construction vehicle having a frame with at least one set of wheels and at least one material handling implement operatively associated with said frame, comprising:

at least one elongated stabilizer arm having one end pivotally connected to the frame about a fixed stabilizer pivot point and another end movable from a ground engaging position extending laterally beyond one of said wheels for providing lateral stabilization and support of said vehicle during operation of said material handling implement, to a generally upright over-center transport position during movement of said vehicle, and defining a pivotable stabilizer axis extending between said one end of said stabilizer arm and said other end of said stabilizer arm; and fluid cylinder means pivotally connected to said frame about a fixed fluid cylinder piovt point and operatively connected to said stabilizer arm at a location spaced from said fixed stabilizer pivot point for moving said stabilizer arm from said ground engaging position to said over-center transport position, said fixed fluid cylinder pivot point being positioned laterally outward of said fixed stabilizer pivot point and said fluid cylinder means defining a pivotable fluid cylinder axis extending through the connections to said frame and said stabilizer arm, and said pivotable fluid cylinder axis being located laterally outward of said pivotable stabilizer axis when said stabilizer arm is in said over-center transport position.

2. A stabilizer assembly in accordance with claim 1 wherein:

said stabilizer arm includes a pair of stabilizer arm members spaced from each other, and wherein said fluid cylinder means is positioned intermediate said pair of stabilizer arm members as viewed in top plan view.

3. A stabilizer assembly in accordance with claim 1 further including:

a stabilizer foot, and a common pivot pin pivotally connecting said stabilizer foot to said other end of said stabilizer arm and said fluid cylinder means.

4. A stabilizer assembly in accordance with claim 1 wherein said stabilizer arm is generally straight and is positioned laterally inward of said fixed fluid cylinder pivot point in said over-center transport position.

5. A stabilizer assembly in accordance with claim 1 wherein:

said fixed fluid cylinder pivot point is positioned above said fixed stabilizer pivot point, and said stabilizer arm is interposed inwardly of the outer edges of said wheels in said over-center transport position.

6. A stabilizer assembly in accordance with claim 1 wherein said pivotable stabilizer axis is generally vertical and said pivotable fluid cylinder axis is inclined upwardly and inwardly when said stabilizer arm is in said over-center transport position.

7. A stabilizer assembly for a construction vehicle having a frame with at least one pair of wheels and at least one material handling implement operatively associated with said frame, comprising:

a first stabilizer arm positioned in proximity to one of said wheels and a second stabilizer arm positioned in proximity to the other of said wheels, each of said stabilizer arms having one end pivotally connected to the frame about a fixed stabilizer pivot point and another end movable from a ground engaging position to a generally vertical over-center transport position;

a first fluid cylinder and a piston rod assembly operatively associated with said first stabilizer arm and a second fluid cylinder and piston rod assembly operatively associated with said second stabilizer arm, each fluid cylinder and piston rod assembly being pivotally connected to said frame about a fixed fluid cylinder pivot point and pivotally connected to the other end of one of said stabilizer arms for moving said stabilizer arm from said ground engaging position to said over-center transport position;

the minimum distance between said fixed fluid cylinder pivot points of said first and second fluid cylinder and piston rod assemblies being greater than the minimum distance between the fixed stabilizer pivot points of said first and second stabilizer arms, and the level of said fixed fluid cylinder pivot points being positioned above the level of said fixed stabilizer pivot points; and said stabilizer arms being positioned generally upright and between said fixed fluid cylinder pivot points when said stabilizer arms are in said over-center transport positions so as to substantially avoid accidentally extending outward of said wheels in said over-center transport position should either of said fluid cylinder means accidentally leak.

8. A stabilizer assembly in accordance with claim 7 wherein said stabilizer arms are positioned between the outer edges of said wheels in said over-center transport position.

9. A stabilizer assembly in accordance with claim 7, wherein each of said stabilizer arms includes:

a pair of stabilizer arm members spaced from each other to define a passageway therebetween for accommodating passage of said associated fluid cylinder and piston rod assembly during movement of said stabilizer arm from said ground-engaging position to said over-center transport position and for permitting passage of dirt and other material from the ground when said stabilizer arm is moving into and out of said ground-engaging position;

said associated fluid cylinder and piston rod assembly having an end pivoted on said fixed fluid cylinder pivot points and being positioned intermediate said pair of stabilizer arm members as viewed in top plan view;

a stabilizer foot; and a common pivot point pivotally connecting said stabilizer foot to both said associated fluid cylinder and piston rod assembly and said pair of stabilizer arm members.

10. A backhoe, comprising:

a frame having opposed sides and a front end and a rear end extending laterally between and connecting said opposed sides, each of said sides having a fluid ram support bracket, a first stabilizer arm member support bracket and a second stabilizer arm member support bracket;

front wheels and rear wheels for accommodating movement of said backhoe and for dynamically supporting said frame during movement of said vehicle;

each of said stabilizer arm member support brackets being positioned adjacent one of said rear wheels;

a material handling implement operatively connected to said rear end of said frame;

a pair of stabilizer arms each having a first stabilizer arm member and a second stabilizer arm member spaced from each other to define a passageway therebetween, said first stabilizer arm members having one end pivotally connected to said first stabilizer pivot point and another end positioned remote from said first fixed stabilizer pivot point, said second stabilizer arm members having one end pivotally connected to said second stabilizer pivot point and another end positioned remote from said second fixed stabilizer pivot point, a stabilizer foot, a common pivot pin pivotally connecting said stabilizer foot to said other ends of said stabilizer arm members and said other ends of said stabilizer arm members being movable from a ground engaging position extending laterally beyond said adjacent rear wheel for providing lateral stabilization and support of said backhoe during operation of said material handling implement, to a generally over-center transport position during movement of said backhoe;

a first fluid ram operatively associated with said first stabilizer arm and a second fluid ram operatively associated with said second stabilizer arm, each fluid ram having one end pivotally connected to said fluid ram support bracket about a fixed fluid cylinder pivot point and another end pivotally attached to said common pivot pin of an associated stabilizer arm for moving said associated stabilizer arm from said ground engaging position to said over-center transport position;

said first and second fixed stabilizer pivot points being positioned laterally inward and below said fixed stabilizer pivot point; and said stabilizer arms being positioned generally upright between said fixed fluid cylinder pivot points when said stabilizer arms are in said over-center transport position so as to substantially avoid accidentally extending outward of said wheels in said over-center transport position should either of said fluid cylinder means accidentally lose substantial fluid pressure.

11. A backhoe in accordance with claim 10 wherein each of said stabilizer arm members are of generally the same size and shape and are positioned in general parallel relationship with each other.

12. A backhoe in accordance with claim 10 wherein the lateral spacing between said first fixed stabilizer pivot point and said fixed fluid cylinder point is generally equal to the lateral spacing between said second fixed stabilizer pivot point and said fixed fluid cylinder pivot point.

13. A backhoe in accordance with claim 12 wherein said first and second fixed stabilizer pivot points are positioned generally at the same height and are spaced generally equally from said fixed fluid cylinder pivot point.

* * * * *

UNITED STATES PATENT AND TRADEMARK OFFICE

CERTIFICATE OF CORRECTION

PATENT NO. : 4,132,324

DATED : January 2, 1979

INVENTOR(S) : Elton B. Long

It is certified that error appears in the above-identified patent and that said Letters Patent are hereby corrected as shown below:

Column 1, line 23, insert a --semicolon-- after "3,951,281" and delete the comma.

Column 4, line 29, "extending" should read --extend--.

Column 4, line 56, delete "48 and".

Column 4, line 60, delete "48 and".

Column 4, line 63, delete "48 and".

Column 5, line 11, after "and" insert --forms--.

Column 5, line 21, "member" should read --members--.

Claim 1, Column 6, line 38, "piovt" should read --pivot--.

Claim 7, Column 7, line 33, "arm" should read --arms--.

Signed and Sealed this

*Twenty-ninth* Day of *May 1979*

[SEAL]

*Attest:*

RUTH C. MASON
*Attesting Officer*

DONALD W. BANNER
*Commissioner of Patents and Trademarks*